June 12, 1945. H. L. FITCH ET AL 2,378,206
LIGHT CONTROL FOR PHOTOGRAPHIC PRINTERS
Filed March 18, 1944 2 Sheets-Sheet 1

HAROLD L. FITCH
STANLEY L. SCUDDER
INVENTORS

BY
ATTORNEYS

June 12, 1945.  H. L. FITCH ET AL  2,378,206
LIGHT CONTROL FOR PHOTOGRAPHIC PRINTERS
Filed March 18, 1944.  2 Sheets-Sheet 2

HAROLD L. FITCH
STANLEY L. SCUDDER
INVENTORS
BY
ATTORNEYS

Patented June 12, 1945

2,378,206

UNITED STATES PATENT OFFICE 2,378,206

LIGHT CONTROL FOR PHOTOGRAPHIC PRINTERS

Harold L. Fitch and Stanley L. Scudder, Rochester, N. Y., assignors to Eastman Kodak Company, Rochester, N. Y., a corporation of New Jersey Application March 18, 1944, Serial No. 527,084

18 Claims. (Cl. 95—75)

The present invention relates to photographic printers for motion picture film, and more particularly to an automatic light control for such printers.

As is well known in the motion picture printing art, a motion picture positive is printed from a negative either by the contact or projection method. In either method, the light supplied to the film during the printing operation is varied either in quantity and/or quality to compensate for the various densities of different portions of the negative resulting from the different light conditions present during the taking of the various scenes. As is common practice, the light conditions required for the proper printing of the different portions of the negative are determined prior to the actual printing operation. With this information available, various devices are adjusted so that the printing light will be automatically varied and/or controlled at the proper time and in the proper amount during the travel of the film through the printer, each change in light condition being controlled by a notch formed on the edge of the film. These notches are positioned at the points along the negative in proper relation to the portions where a change in the light condition is required, all as well known to those in the art.

In printing black-and-white film, the changing light conditions may be secured by providing a constant or unvarying light aperture and then changing the intensity of the light source. However, when printing color film it is imperative that the color temperature of the light source be maintained constant and unvarying so as to thus insure the proper color balance on the film being printed, all of which is well known to those working in color photography. For this reason, when color films are printed, a constant light source of a definite color temperature must be provided, and the quantity of light reaching the film is then changed by a suitable light varying means such as a variable opening diaphragm. The changing of the diaphragm opening may be controlled by the notches formed on the film edge, such notches being positioned in proper relation to the place at which the change in the light condition is required. As motion picture printers usually operate at relatively high speeds, such as 70 feet per minute or more, it is also highly desirable that the variations in the light conditions should be substantially instantaneous so that density changes will take place in the space of one picture frame or less, rather than over a number of frames, thus eliminating the undesirable "fade-in" and "fade-out" effects. It is also of extreme importance that after the diaphragm has been moved to provide the required light opening, the diaphragm rigidly and positively maintain its adjustment so as not to flutter or vibrate, the disadvantages of which will be readily apparent to those in the art.

The present invention has, therefore, as its principal object a new and improved light control mechanism for varying the quantity of a constant color light source supplied to the film during the printing operation.

A further object of the invention is the provision of a mechanism of the class described which is operated substantially instantaneously so that changes in film density take place over one picture frame or less.

Still another object of the invention is the provision of a diaphragm construction and control mechanism which will positively maintain the diaphragm in adjusted position so as to prevent vibration and flutter thereof.

Yet another object of the invention is the provision of a compact light control mechanism which may be readily and easily connected to or disconnected as a unit from the printer.

And another object of the invention is the provision of such a mechanism which is formed of few parts of rugged construction, and which is simple to adjust and positive in its operation.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
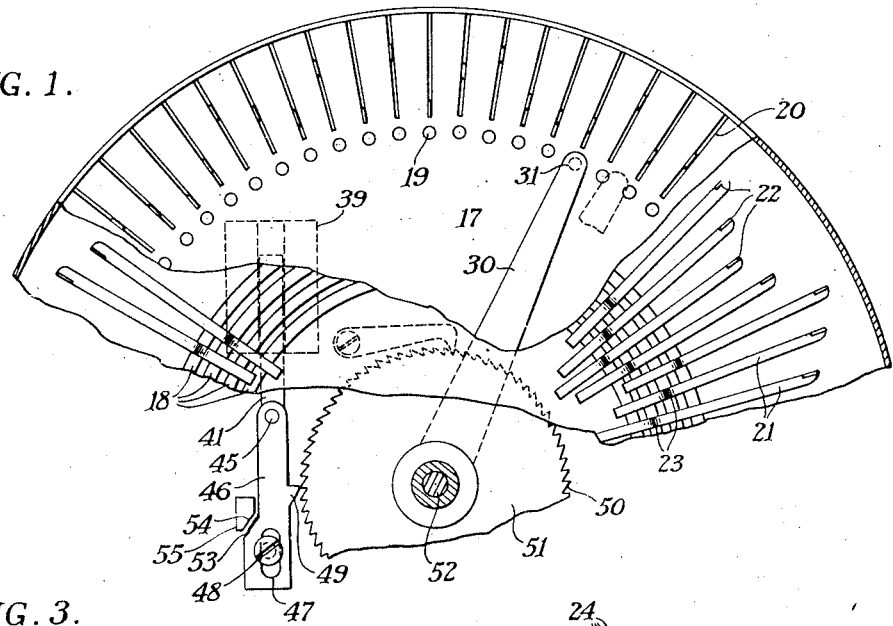
Fig. 1 is a view of a portion of a preset control device, with parts cut away, and the cover removed to show the arrangement of the various mechanisms.

As is common practice, the negative to be printed is first inspected to ascertain not only the different light conditions required for various portions of the negative, but also the precise point at which the light conditions should be varied. These points of light changes are usually indicated by notches placed at predetermined points along the edge of the film, one such notch being shown at 11, Fig. 3, formed on the edge of the film strip 12. These notches are then utilized to actuate certain control mechanisms to adjust the diaphragm opening the proper amount and at the required time. In order, however, that the proper functioning of the diaphragm will take place in accordance with the light conditions required for the different portions of film, a control board or device is manually preset or adjusted so that the various film notches will be effective, not only to control the diaphragm openings at the proper time intervals but also for the proper amount.

To this end, the present invention provides a manually settable control device which is adjusted in accordance with the sequence of the required light changes. This device comprises a housing 15 in which are positioned a pair of substantially parallel plates 16 and 17, the former having mounted thereon four concentric conductor rings 18 while the latter is provided with a single row of separate contacts 19. The plates 16 and 17 may be formed of an insulating material or the various contacts or rings may be suitably electrically insulated from each other, as is apparent. The plate 17 is provided with a plurality of radial slots 20 in which contact fingers 21 are slidably mounted. Each finger is provided with an upstanding finger-gripping portion 22 by which the finger may be radially moved inwardly to bring the contact section 23 thereof into engagement with one of the conductor rings 18, as clearly illustrated in Fig. 2. The fingers also engage the contacts 19 and thus provide an electrical connection between the individual contacts 19 and one of the rings 18. Four such rings are shown so that four separate positions may be provided, while a fifth adjustment may be made when the finger 21 is moved so that the section 23 is moved out of engagement with any of the rings 18, as will be apparent from an inspection of Fig. 2. The fingers 21 thus provide a means for selectively connecting each contact 19 to one of the conductor rings 18. The latter are, in turn, connected through the leads 24 to four separate solenoids 25, each of which is connected through a wire 26 to the return wire 27 leading to a supply of direct current, such as a battery 28. By means of this arrangement each contact 19 may be selectively connected to one of the solenoids 25, the purpose of which construction will be later more fully described.

Figure 2:
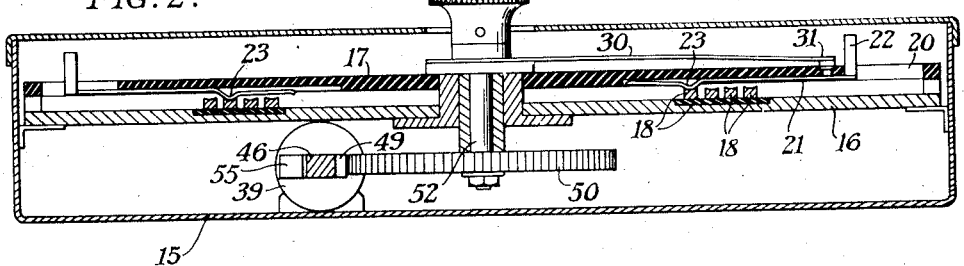
Fig. 2 is a sectional view through the control device illustrated in Fig. 1, showing the arrangement by which various circuits may be preselected in accordance with the light conditions required for the negative to be printed.

A rotatable contact arm 30 is arranged to move over the plate 17 so that the free end 31 will successively engage the contacts 19, as shown in Fig. 1. The end 31 is of such a width as to span two separate contacts 19, as illustrated in dotted line, Fig. 1, and for a purpose to be later more fully described. The arm 30 is connected through the lead 32 to the opposite side of the battery 28 thus electrically connecting the arm 30, contacts 19, rings 18, and solenoids 25, as will be apparent from an inspection of Fig. 3. A main control switch 33 may be positioned in the lead 32. The control device illustrated in Figs. 1 and 2 is first manually set so as to control the light conditions in proper sequence and in the proper amount. To secure this result, the individual fingers are moved to engage one of the rings 18 connected to one of the solenoids so that the proper solenoid will be actuated at the proper time and in the proper sequence.

As is common practice, the notches 11 in the film 12 are utilized to initiate the operation of the various control members or devices. For this reason a small "Micro"-switch 34 is provided with an operating plunger 35 adapted to ride on the edge 36 of the film strip, as will be apparent from an inspection of Figs. 3 and 5. A lead 37 connects the switch 34 with the battery connection 32 while a wire 38 connects the switch to a solenoid 39 which, in turn is connected by the wire 40 to the battery lead 27, as clearly illustrated in Fig. 3. Thus the switch 34 and solenoid 39 are connected into the battery circuit.

Figure 3:
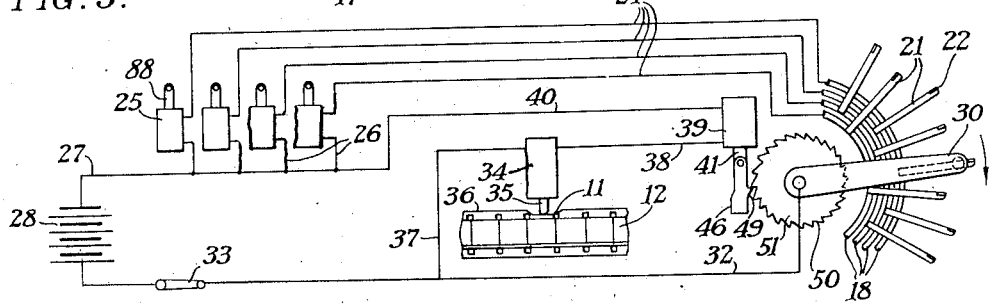
Fig. 3 is a wiring diagram of the various control members.

As mentioned above, the plunger 35 rides on the edge 36 of the film strip, but when a notch 11 registers with the plunger, the latter drops into the notch, as illustrated in Fig. 3. Such movement of the plunger automatically closes the "Micro" switch 34 to complete the circuit to the solenoid 39 to energize the latter to cause the armature 41 thereof to move upwardly. The armature 41 has connected thereto, by means of a pin 45, one end of a pawl 46 the other end of which is provided with a slot 47 adapted to receive a headed nut 48 secured to the housing 15 so that the pawl 46 will slide upon movement of the armature 41. Such movement of the pawl 46 brings a tooth 49 thereof into engagement with teeth 50 of a ratchet 51 carried by a shaft 52 to which the arm 30 is secured, the shaft being suitably electrically insulated from the plates 16 and 17. Thus each time the solenoid 39 is energized, by means of the dropping of the plunger 35 into a notch 11, the pawl 46 will be moved upwardly to impart a rotating movement to the ratchet 51 and hence the arm 30 to move the latter from one contact 19 to the next. In order that such movement may be made rapidly, the arm 30 is preferably made as light as possible and preferably in the form of a thin flat strip of metal. The shaft 52 may have secured thereto a hand-operating knob 56 for returning the arm 30 to its original or any desired position.

To insure that the arm 30 will be moved only the distance of one contact upon each actuation of the solenoid 39, the pawl 46 is provided with an inclined surface 53 adapted to engage a similarly shaped surface 54 formed on a fixed stop 55. Thus each time the pawl is moved, the surface 53 thereof moves into engagement with the surface 54. Such engagement serves to first shift the pawl 46 to the right to bring the tooth 49 thereof into driving relation with a tooth 50 to rotate the ratchet 51 the distance of one tooth, and to move the arm 30 over to the next contact. After the ratchet has been moved the distance of one tooth, the surfaces 53 and 54 then wedge to prevent further upward movement of the pawl. Thus each time the notch 11 comes into registry with the plunger 35, the arm 30 is moved a distance of one contact and one contact only. Such movement will ordinarily connect the newly engaged contact 19 to one of the rings 18 to thus energize one of the solenoids 25 to change the quantity of light reaching the film, as will be readily apparent. If, however, the finger 21 connected to the engaged contact 19 is not connected to any ring 18, no circuit is closed, as will be apparent.

Figure 4:
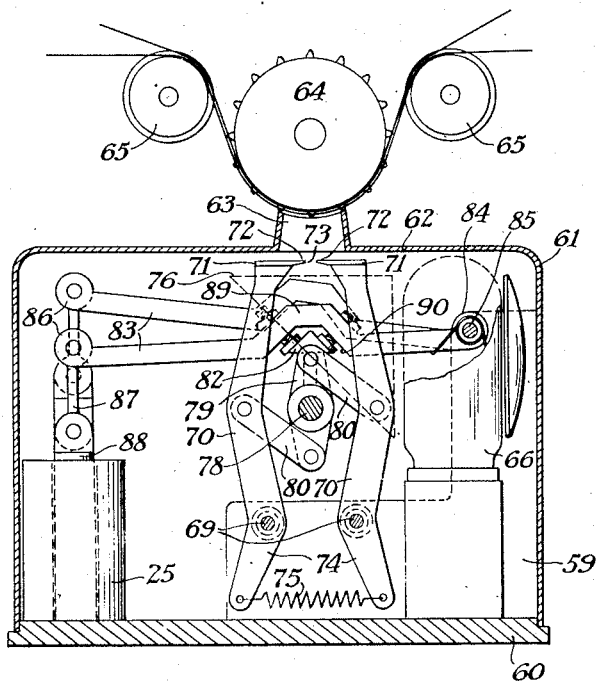
Fig. 4 is a partial view of a portion of a motion picture printer, showing the relation thereto of a light varying control mechanism constructed in accordance with the present invention.

Referring now to Fig. 4, there is shown a light control mechanism constructed in accordance with the present invention. This light control comprises a housing, generally indicated by the numeral 59 and formed with a base 60 and a removable cover member 61 the top 62 of which is provided with an exposure aperture 63 across which the pair of films used in the printing operation are passed by means of a feed roller 64. Guide rollers 65 are provided for guiding the pair of films over the roller 64 and across the exposure aperture 63. The housing 59 has mounted therein a light source in the form of an electric lamp 66. For reasons stated above, the lamp 66 is operated at a constant intensity to provide a light source of unvarying color, the advantages of which will be apparent to those in color photography. Suitable reflecting members, such as a prism 76, are provided for directing the light rays from the lamp to the exposure aperture 63. The housing 59 is provided with a pair of spaced end walls 67 and 68, the latter of which has rockably mounted thereon, by means of studs 69, a pair of diaphragm members 70 of the shape best shown in Fig. 4. The upper ends of the members 70 are provided with plates 71 the adjacent tapered edges 72 of which may be variably spaced to provide a diaphragm opening 73 which serves to control the quantity of light transmitted from the constant light source 66 to the films moving over the exposure aperture 63, as clearly illustrated in Fig. 4. The edges 73 are preferably tapered, as shown, to insure clear cut exposures.

It will be apparent from an inspection of Fig. 4 that if the arms 70 are moved about their pivots 69 in a direction to separate the edges 72, the diaphragm opening 73 will be increased to thus admit a greater quantity of light to the films being printed. On the other hand, movement of the arms in the opposite direction will cause the edges 72 to approach each other to thereby decrease the size of the diaphragm opening to reduce the quantity of light transmitted to the film moving over the exposure aperture 63. The lower ends 74 of the arms 70 are connected by a spring 75 which tends to move the edges 72 away from each other to provide the maximum diaphragm opening. Four intermediate diaphragm openings are secured by reason of the four solenoids 25, as will be later explained.

Figure 5:
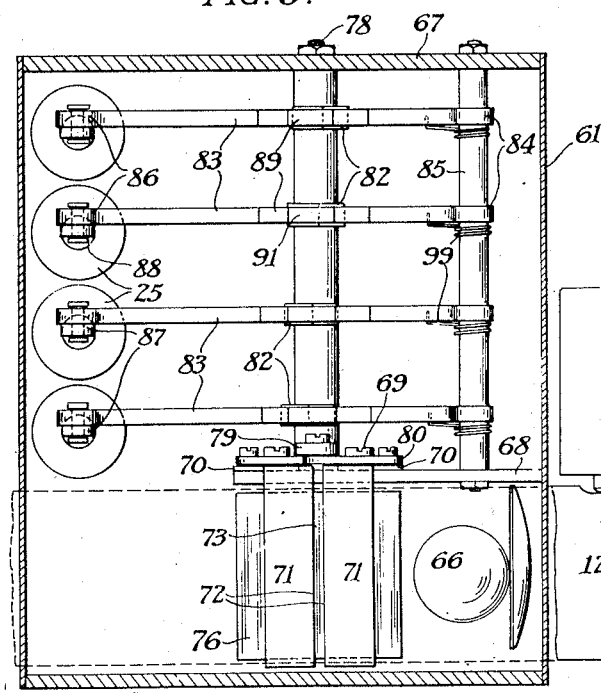
Fig. 5 is a plan view of the mechanism illustrated in Fig. 4.
Figure 6:
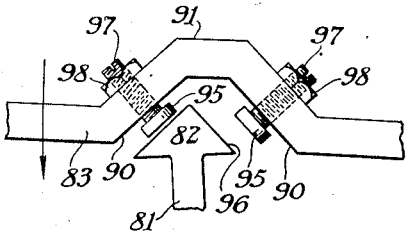
Fig. 6 is a partial view of the mechanism illustrated in Fig. 4, and showing the moving and holding mechanism for the diaphragm prior to the actuation or engagement thereof for moving the diaphragm to one position of adjustment.
Figure 7:
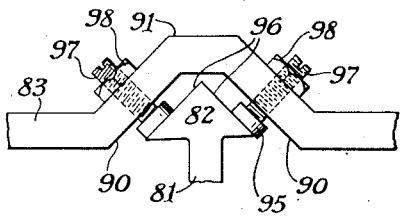
Fig. 7 is a view similar to Fig. 6, showing the members in engaged position to retain the diaphragm in its adjusted position.
Figure 8:
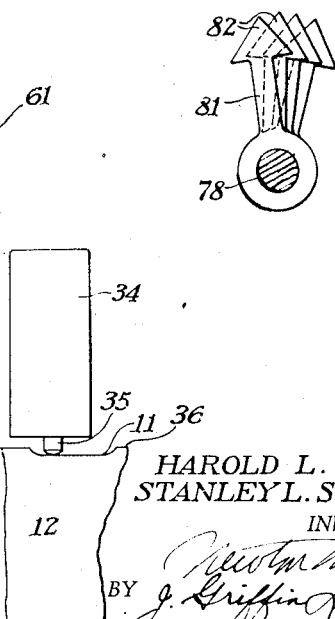
Fig. 8 is an end view of the diaphragm actuating shaft showing the relation thereto of the shutter adjusting members thereon.

The end walls 67 and 68 have journaled therein a shaft 78 one end of which has secured thereto a crank 79 the opposite ends of which are connected by links 80 to the diaphragm arms 70, as shown in Fig. 4. It will be now apparent from this figure that rotation of the shaft 78 in a counterclockwise direction will cause the links 80 to move the arms 70 to bring the edges 72 closer together to reduce the diaphragm opening, while a clockwise rotation will serve to move the edges 72 apart to increase the diaphragm opening. Thus the rotation of the shaft 78 may be utilized in adjusting the opening 73. The shaft 78 has also mounted thereon four radially extending projecting members 81 each of which terminates in a prong-shaped head 82, as best shown in Figs. 6 to 8. These adjusting members are spaced axially along the shaft 78, as shown in Fig. 5, and are offset angularly relative to each other, as shown in Fig. 8. Due to the fact that all the members 81 are spaced at different angular relation, the shaft 78 must be variably moved rotatively to successively bring each of these members to the vertical position, as shown in Fig. 7. Thus four separate movements must be imparted to the shaft 78, and these movements are utilized in moving the edges 72 to four different positions to provide four separate diaphragm openings distinct from that formed by the spring 75. The members 81 thus cooperate with the spring 75 to provide five different shutter adjustments.

The members 81 are selectively moved to the vertical position to provide the required shutter opening, by means of levers 83, each of which has one end 84 thereof pivotally or rockably mounted on a rod 85 secured to the end walls 67 and 68, as shown in Fig. 5. The opposite end 86 of each lever 83 is connected by a link 87 to the armature 88 of one of the solenoids 25 so that each arm 83 is separately and independently connected to one and only one of the solenoids 25. As each lever 83 is identical in construction, further description for one will suffice for all. Each lever 83 is formed adjacent its midpoint with an offset portion 89 formed with spaced sloping or inclined sides 90 connected by a substantially horizontal section 91.

This offset portion 89 is arranged to overlie one of the adjusting members 81 and to receive the prong-shaped head 82, as clearly illustrated in Figs. 6 and 7. Each inclined side 90 is provided with an adjustable contacting member 95 adapted to engage one of the inclined faces 96 of the prong-like head 82, as shown in Fig. 7. The members 95 are mounted on threaded members 97 which threadably engage in the sides 90. Nuts 98 serve to retain the members 95 in adjusted position. The engagement of the members 95 with the faces 96 serve to rock the corresponding and cooperating member 81 from a non-vertical position, as shown in Fig. 6 to a vertical position as shown in Fig. 7. Such rocking movement of the member 81 imparts a corresponding rocking movement to the shaft 78 to thus move the arms 70 to adjust the spacing of the edges 72 to provide the required diaphragm opening 73. As the members 81 are angularly offset, different rocking movement will be applied to the shaft 78 when each member 81 is moved by its corresponding lever 83.

As each lever 83 is connected to one of the solenoids 25, the levers will be moved each time its solenoid is energized. However, as mentioned above, the solenoids 25 are connected into the circuit of the rings 18 and contacts 19 and movable arms 30. Therefore when the arm 30 engages one of the contacts 19, which in turn is connected to one of the rings 18, by reason of a finger 21 one of the solenoids will be energized to rock the corresponding lever 83 to move the latter into engagement with the adjusting member 81 to rock the shaft 78 to thereby adjust the diaphragm opening. The particular solenoid 25 thus energized depends, of course, on which ring 18 is connected to the slidable finger 21. Thus by preliminarily adjusting the fingers 21, the solenoids may be energized in the proper sequence to vary the diaphragm opening in accordance with the light intensity selected for the different parts of the film. If, however, the contact 19 engaged by the arm 30 is not connected to a ring 18 by a finger 21, the circuits to the solenoids 25 are all open and the spring 75 then becomes effective to move the diaphragm to its maximum opening. When any one of the solenoids 25 is deenergized by movement of the arm 30, a spring 99 serves to move the lever 83 upwardly and out of contact with the head 82 to release the corresponding member 81. However, the end 31 of the arm 30 is wide enough to span two contacts 19 so that one of the solenoids will be energized before the preceding one is released, thus preventing any tendency for the diaphragm to fly to open position under the action of the spring 75, the disadvantages of which are obvious.

As the various diaphragm adjustments are made in the space of one picture frame or less, obviously the diaphragm will be rapidly moved to its new adjusted position. Such rapid movement may tend to cause the diaphragm to vibrate or flutter some time after its adjustment. It is important, therefore, that means be provided for effectively and positively preventing such flutter and to rigidly retain or hold the diaphragm in its adjusted position. It will be apparent, however, that when the lever 83 is moved to the engaging position, the lever is firmly held in this position by reason of the fact that the solenoid 25 has been energized. It is also apparent that a solid unyielding and rigid connection is then provided between the lever 83 and the plates 71 which forms the diaphragm opening. This rigid connection provides a rugged structure which not only moves the diaphragm to adjusted position, but positively prevents any undesirable vibration or flutter of the diaphragm after being so adjusted. While such an arrangement provides a rugged structure, the various parts are relatively light in weight so that the adjustment of the diaphragm is substantially instantaneous. Thus the diaphragm is quickly moved into adjusted position and is securely held so as to provide a substantially instantaneous change in light conditions rather than a gradual or pulsating change which would occur if the diaphragm were allowed to vibrate.

It will be thus apparent from the above description that the present invention provides a light control mechanism, which will automatically change the quantity of light applied to the film in accordance with the light intensity selected for the various portions of the film. Furthermore, the light changes are rapid so that the density changes will take place over only one picture frame or less. As the light source is maintained at a constant temperature, the proper color balance is assured. Finally, the diaphragm vibration is effectively eliminated. While only five diaphragm adjustments have been shown, this is by way of illustration only, as it is obvious that this number may be readily changed to suit the particular conditions required without departing from the present invention.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

We claim:

1. In a motion picture printing machine provided with a lamp house formed with a printing aperture past which a film to be printed is moved, the combination with a constant intensity light source positioned in said lamphouse for supplying printing light at said aperture, and a diaphragm mounted on said lamphouse and having an opening which is variable for controlling the quantity of light supplied to said film at said aperture, of a plurality of adjusting members angularly spaced about an axis and connected to said diaphragm and adapted to be variably moved to adjust the diaphragm opening, separate actuating elements independently connectable to said members to impart movement thereto, and a mechanism controlled by the moving film for selectively operating said actuating elements in a predetermined order to vary the diaphragm opening in accordance with the various light intensities selected for printing different portions of the film.

2. In a motion picture printing machine provided with a lamphouse formed with a printing aperture past which a film to be printed is moved, the combination with a constant intensity light source positioned in said lamphouse for supplying printing light at said aperture, and a diaphragm mounted on said lamphouse and having an opening which is variable for controlling the quantity of light supplied to said film at said aperture, of a plurality of adjusting members angularly spaced about an axis and connected to said diaphragm and adapted to be variably moved to adjust the diaphragm opening, means independently connectible to said members for imparting movement thereto to control said opening, means for positively holding said diaphragm in adjusted position, and a mechanism controlled by the moving film for selectively operating said member moving means in a predetermined order to vary the shutter opening in accordance with the various light intensities selected for printing different portions of the film.

3. In a motion picture printing machine provided with a lamphouse formed with a printing aperture past which a film to be printed is moved, the combination with a constant intensity light source positioned in said lamphouse for supplying printing light at said aperture, and a diaphragm mounted on said lamphouse and having an opening which is variable for controlling the quantity of light supplied to said film at said aperture, of a plurality of adjusting members angularly spaced about an axis and connected to said diaphragm and adapted to be variably moved to adjust the diaphragm opening, means independently connectible to said members for imparting movement thereto to control said opening and for positively holding said members to retain the adjustment of said diaphragm and a mechanism controlled by the moving film for selectively operating said means in a predetermined order to vary the diaphragm opening in accordance with the various light intensities selected for printing the different portions of the film.

4. In a motion picture printing machine provided with a lamphouse formed with a printing aperture past which a film to be printed is moved, the combination with a constant intensity light source positioned in said lamphouse for supplying printing light at said aperture, and a diaphragm mounted on said lamphouse and having an opening which is variable for controlling the quantity of light supplied to said film at said aperture, of a plurality of adjusting members angularly spaced about an axis and connected to said shutter and adapted to be variably moved to adjust the diaphragm opening, a plurality of arms pivotally mounted on said machine, each of said arms being adapted to selectively engage one of said members to impart movement thereto to move said diaphragm to adjust the opening thereof, and a mechanism controlled by the moving film for selectively actuating said arms in a predetermined order to vary the shutter opening in accordance with various light intensities selected for printing different portions of the film.

5. In a motion picture printing machine provided with a lamphouse formed with a printing aperture past which a film to be printed is moved, the combination with a constant intensity light source positioned in said lamphouse for supplying printing light at said aperture, and a diaphragm mounted on said lamphouse and having an opening which is variable for controlling the quantity of light supplied to said film at said aperture, of a plurality of adjusting members angularly spaced about an axis and connected to said diaphragm and adapted to be variably moved to adjust the diaphragm opening, a plurality of arms pivotally mounted on said machine, each of said arms being adapted to selectively engage one of said members to impart movement thereto to move said diaphragm to adjust the opening thereof, means for holding said members after the movement thereof by said arms to positively retain said diaphragm in adjusted position, and a mechanism controlled by the moving film for selectively actuating said arms in a predetermined order to vary the diaphragm opening in accordance with the various light intensities selected for printing different portions of the film.

6. In a motion picture printing machine provided with a printing aperture past which the film to be printed is moved, the combination with a constant intensity light source adapted to supply printing light to said aperture, and a variable opening diaphragm positioned intermediate said light source and said aperture, of a plurality of diaphragm adjusting members angularly spaced about an axis of movement and operatively connected to said diaphragm, a plurality of independent pivotally mounted arms mounted on said machine, each of said arms being movable into engagement with one only of said members to impart a movement to said one member about said axis to move said diaphragm to adjust said opening, a separate solenoid connected to each arm, and means controlled by the moving film for actuating said solenoids one at a time and in a predetermined order to vary the diaphragm opening in accordance with the various light intensities selected for printing different portions of the film.

7. In a motion picture printing machine formed with a printing aperture past which a film to be printed is moved, the combination with a constant intensity light source carried by said machine and positioned to direct light rays to said aperture to print said film, and a diaphragm movably mounted adjacent said aperture and formed with an opening the size of which may be varied to control the quantity of light supplied to said aperture, of a plurality of adjusting members connected to said diaphragm and angularly spaced about a common axis of movement, a plurality of separate actuating levers each of which is adapted to be moved to engage only one of said members to move the latter a predetermined distance about said axis to move said diaphragm to one position of adjustment, the engagement of the other levers with their corresponding members serving to move said corresponding members different distances about said axis to move said diaphragm to other positions of adjustment, and means operated in timed relation to the movement of said film for moving said actuating levers in a predetermined order to adjust the opening of said diaphragm in accordance with the various light intensities selected for printing different portions of the film.

8. In a motion picture printing machine formed with a printing aperture past which a film to be printed is moved, the combination with a constant intensity light source carried by said machine and positioned to direct light rays to said aperture to print said film, and a diaphragm movably mounted adjacent said aperture and formed with an opening the size of which may be varied to control the quantity of light supplied to said aperture, of a plurality of adjusting members connected to said diaphragm and angularly spaced about a common axis of movement, a plurality of separate actuating levers each of which is adapted to be moved to engage only one of said members to move the latter a predetermined distance about said axis to move said diaphragm to one position of adjustment, the engagement of the other levers with their corresponding members serving to move said corresponding members different distances about said axis to move said diaphragm to other positions of adjustment, means for positively retaining said diaphragm in its various adjusted positions, and means operated in timed relation to the movement of said film for moving said actuating levers in a predetermined order to adjust the opening of said diaphragm in accordance with the various light intensities selected for printing different portions of the film.

9. In a motion picture printing machine formed with a printing aperture past which a film to be printed is moved, the combination with a constant intensity light source carried by said machine and positioned to direct light rays to said aperture to print said film, and a diaphragm movably mounted adjacent said aperture and formed with an opening the size of which may be varied to control the quantity of light supplied to said aperture, of a plurality of adjusting members connected to said diaphragm and angularly spaced about a common axis of movement, means for selectively moving said members about said axis in a predetermined order to adjust the opening of said diaphragm and for then positively holding said diaphragm in adjusted position, and means operated in timed relation to the movement of said film for controlling said means in a definite time sequence so that said diaphragm opening will be adjusted in accordance with the various light intensities selected for printing different portions of the film.

10. In a motion picture printing machine formed with a printing aperture past which a film to be printed is moved, the combinations with a constant intensity light source carried by said machine and positioned to direct light rays to said aperture to print said film, and a diaphragm movably mounted adjacent said aperture and formed with an opening the size of which may be varied to control the quantity of light supplied to said aperture, of a plurality of adjusting members connected to said diaphragm and angularly spaced about a common axis of movement, a plurality of separate actuating levers each of which is adapted to be moved to engage only one of said members to move the latter a predetermined distance about said axis to move said diaphragm to one position of adjustment, the engagement of the other levers with their corresponding members serving to move said corresponding members different distances about said axis to move said diaphragm to other positions of adjustment, an adjustable element carried by each lever for initially securing the proper diaphragm openings, and means operated in timed relation to the movement of said film for moving said actuating levers in a predetermined order to adjust the opening of said diaphragm in accordance with the various light intensities selected for printing different portions of the film.

11. In a motion picture printing machine formed with a printing aperture past which a film to be printed is moved, the combination with a constant intensity light source carried by said machine, of a diaphragm mounted in optical alignment with said aperture and adjustable to provide a variable light opening to control the quantity of light supplied to the film, a shaft supported in said machine, means for connecting said shaft to said diaphragm so that rotative movement of said shaft will move said diaphragm to adjust said opening, a plurality of diaphragm adjusting members carried by said shaft and spaced both axially and angularly thereof, a plurality of levers pivotally mounted on said machine, each of said levers being positioned to overlie one of said members, a part on each of said levers being adapted to engage one of said members when the lever is moved in one direction to rock said shaft to move said diaphragm to one position of adjustment, and means operated in timed relation to the movement of said film for selectively moving the levers one at a time and in a predetermined order to turn said shaft varying amounts to variably move said diaphragm to provide light openings of different sizes.

12. In a motion picture printing machine formed with a printing aperture past which a film to be printed is moved, the combination with a constant intensity light source carried by said machine, of a diaphrgam mounted in optical alignment with said aperture and adjustable to provide a variable light opening to control the quantity of light supplied to the film, a shaft supported in said machine, means for connecting said shaft to said diaphragm so that rotative movement of said shaft will move said diaphragm to adjust said opening, a plurality of diaphragm adjusting members carried by said shaft and spaced both axially and angularly thereof, a plurality of levers pivotally mounted on said members, a part on each of said levers adapted to engage one of said members when the lever is moved in one direction to first rock said shaft to move said diaphragm to one position of adjustment and then to hold positively the diaphragm in its adjusted position, and means operated in timed relation to the movement of said film for selectively moving the levers one at a time and in a predetermined order to turn said shaft varying amounts to variably move said diaphragm to provide light openings of different sizes.

13. In a motion picture printing machine formed with a printing aperture past which a film to be printed is moved, the combination with a constant intensity light source carried by said machine, of a diaphragm mounted in optical alignment with said aperture and adjustable to provide a variable light opening to control the quantity of light supplied to the film, a shaft supported in said machine, means for connecting said shaft to said diaphragm so that rotative movement of said shaft will move said shutter to adjust said opening, a plurality of diaphragm adjusting members carried by said shaft and spaced both axially and angularly thereof, a plurality of levers pivotally mounted on said machine, each of said levers positioned to overlie one of said members, a part on each of said levers being adapted to engage one of said members when the lever is moved in one direction to rock said shaft to move said diaphragm to one position of adjustment, and a separate solenoid connected to each lever and adapted to be energized in timed relation to the movement of the film for selectively moving said levers one at a time and in a predetermined order to adjust said diaphragm openings in accordance with the various light intensities selected for printing different portions of the film.

14. In a motion picture printing machine formed with a printing aperture past which a film to be printed is moved, the combination with a constant intensity light source carried by said machine, of a diaphragm mounted in optical alignment with said aperture and adjustable to provide a variable light opening to control the quantity of light supplied to the film, a shaft supported in said machine, means for connecting said shaft to said diaphragm so that rotative movement of said shaft will move said diaphragm to adjust said opening, a plurality of diaphragm adjusting members carried by said shaft and spaced both axially and angularly thereof, a plurality of levers pivotally mounted on said machine, each of said levers positioned to overlie one of said members, a part on each of said levers being adapted to engage one of said members when the lever is moved in one direction to rock said shaft to move said diaphragm to one position of adjustment, adjustable contacting members carried by each lever and movable to provide the required diaphragm opening and means operated in timed relation to the movement of said film for moving said levers one at a time and in a predetermined order to vary said aperture in accordance with the various light intensities selected for printing different portions of the film.

15. In a motion picture printing machine formed with a printing aperture past which a film to be printed is moved, the combination with a constant intensity light source carried by said machine and positioned to direct light rays to said aperture to print said film, of a pair of substantially parallel arms pivotally mounted on said machine, light varying means carried by said arms and positioned intermediate said light source and said aperture, said last mentioned means comprising a pair of plates having substantially parallel adjacent edges which are adapted to be variably spaced to form a light opening of different sizes through which the light rays from the light sources may pass to said film to print the latter, means engaging said arms and tending to move the latter in one direction to provide a light opening of maximum size, and means for variably moving said arms in the opposite direction to move said edges different distances apart to vary the spacing thereof to provide light openings of different sizes, said last mentioned means comprising a shaft carried by said machine, means for operatively connecting said shaft to said arms so that rotative movement of said shaft will move said arms in said opposite direction, a plurality of radially extending members spaced both axially and angularly on said shaft, a plurality of levers pivotally mounted on said machine each of said levers being adapted to be moved into engagement with one of said members only to impart a rotative movement to said shaft to move said arms in said opposite direction to adjust said edges to provide a light opening of predetermined size, and means operated in timed relation to the movement of said film for moving said levers one at a time and in a predetermined order to vary said light opening in accordance with the various light intensities selected for printing different portions of the film.

16. A unitary control device adapted for use on a motion picture printing machine through which a film to be printed is passed comprising, in combination, a housing removably positioned in said machine, a constant intensity lamp arranged within said housing for supplying a light of unvarying color to print the film, a diaphragm carried by said housing, a plurality of independent adjusting members supported by said housing for adjusting said diaphragm to control the quantity of light supplied to said film during printing, and separate actuating members carried by said housing and independently connectable to said members to impart movement thereto and operatively connected to the moving film so as to be actuated in timed relation to the movement thereof through said machine for adjusting said diaphragm in accordance with the various light intensities selected for the different portions of said film.

17. A unitary control device adapted for use on a motion picture printing machine through which a film to be printed is passed comprising, in combination, a housing removably positioned on said machine, a constant intensity lamp arranged within said housing for supplying a light of unvarying color to print the film, a diaphragm carried by said housing and adapted to provide a variable opening for controlling the quantity of light supplied to the film during printing, means including a plurality of actuating members carried by said housing and connectable to said diaphragm for moving the latter to vary the size of said opening, a plurality of rockable arms supported by said housing and separately connectable to said members to move the latter, and control means for said arms operatively connected to and controlled by the movement of said film and in timed relation therewith so as to vary said opening in accordance with the light intensities selected for the different portions of the film.

18. A unitary control device for use on a motion picture printing machine through which a film to be printed is moved comprising, in combination, a housing removably mounted on said machine, a constant intensity light source carried by said housing for supplying a light of unvarying color to print the film, a variable opening diaphragm carried by said housing, a rock shaft journalled in said housing and operatively connected to said diaphragm, a plurality of members carried by said shaft and spaced angularly thereon, a plurality of pivoted arms carried by said housing, said arms being adapted to be individually moved into engagement with one of said members only to rock said shaft to move said diaphragm to adjust the opening thereof, and means supported by said housing and adapted to be operatively connected to and controlled by the movement of said film and in timed relation therewith for actuating said arms one at a time and in a predetermined order to thereby rock said shaft an amount to vary the diaphragm opening in accordance with the preselected light intensities required for printing different portions of the film

HAROLD L. FITCH.
STANLEY L. SCUDDER.